June 19, 1956 R. B. EIPPER 2,751,105
OUTLET BOX FOR WIRING CIRCUITS
Filed March 22, 1954
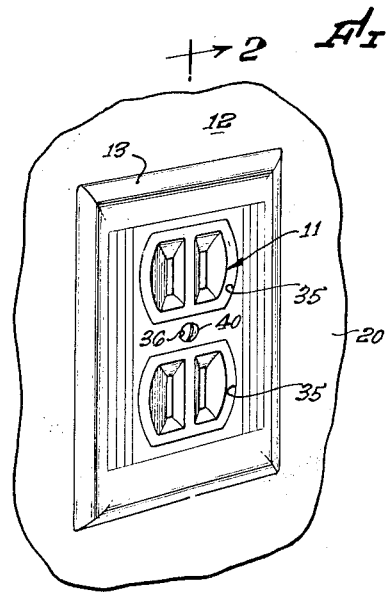
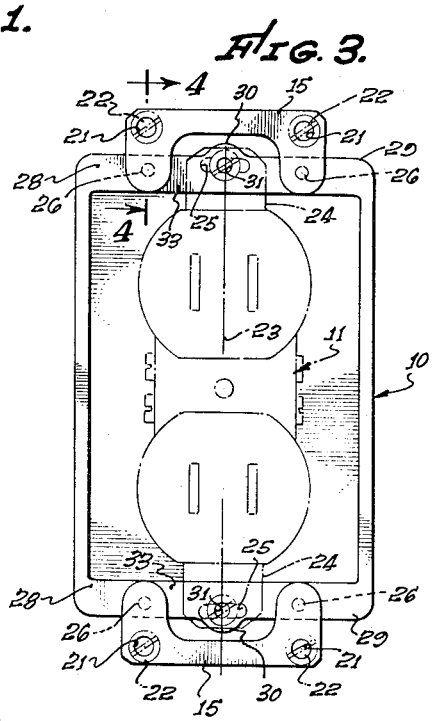
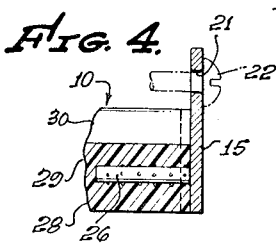
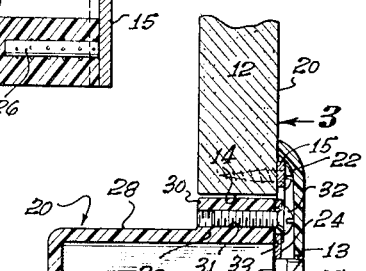
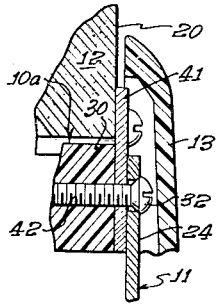
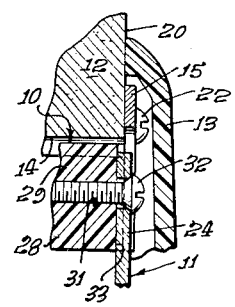
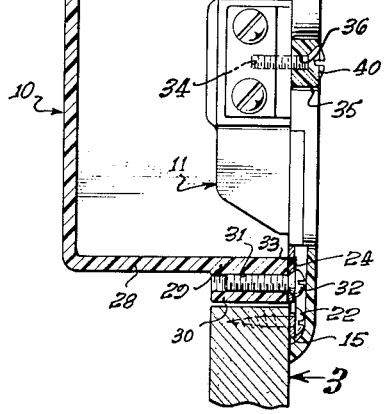
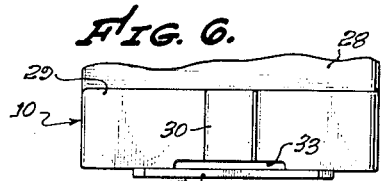
ROBERT B. EIPPER,
INVENTOR.
BY
ATTORNEY.

United States Patent Office 2,751,105
Patented June 19, 1956

2,751,105

OUTLET BOX FOR WIRING CIRCUITS

Robert B. Eipper, Lomita, Calif.

Application March 22, 1954, Serial No. 417,827

2 Claims. (Cl. 220—3.3)

This invention relates to outlet boxes used in the wiring circuits of buildings and the like to enclose such circuit components as switches and plug receptacles. Such an outlet box, which is of elongated rectangular configuration and is made of metal or suitable plastic, has apertured ears at each end to receive nails or screws by means of which the outlet box is mounted at a desired location on a wall.

The circuit component, which usually is either a switch or a plug outlet, also has apertured ears at each end to receive screws by means of which the component is attached to the outlet box. The circuit component, in turn, is adapted to carry a cover plate which is of larger area than the outlet box and which completely conceals the outlet box in the finished installation. The usual switch or the usual single plug receptacle has two threaded bores to receive cover plate screws for this purpose and the usual duplex plug receptacle has a single central threaded bore.

The invention is directed to the problem of providing such a combination of outlet box, circuit component and cover plate, which, when installed in a wall, will result in the cover plate making intimate contact with the wall surface.

The problem does not arise when the outlet box is mounted in a plastered wall, because the ears of the outlet box are set back in the wall behind the layer of plaster at sufficient spacing from the surface of the wall to cause the cover plate to be pulled against the wall surface by the cover plate screws. If, however, the outlet box is mounted in an opening in a thin wall panel, for example in a plywood wall of a house trailer, it will be found that when all of the screws are tightened to mount the circuit component in the outlet box and to mount the cover plate on the circuit component, the cover plate will be spaced outward from the wall surface, the outward spacing being a substantial fraction of an inch. Such outward spacing of the cover plate is unsightly and gives a highly undesirable impression of poor workmanship. The outward spacing is also seriously objectionable because the exposed edges and corners of the cover plate commonly snag clothing and dust cloths and also commonly cause damage to finger nails. Outwardly spaced cover plates made of sheet metal, as distinguished from plastic, are especially objectionable in this regard because the edges are relatively thin and the corners relatively sharp.

It is possible, of course, to re-design the cover plate to eliminate the objectionable outward spacing, but such a cover plate would not be of desirable configuration for the more numerous installations in plastered walls; it would be better to find a solution which would involve the use of conventional cover plates. Since the cover plate is carried by the circuit component, it might be possible to re-design the circuit component to hold the cover plate against the wall surface; but here again the re-designed component would be objectionable in the more numerous installations in plastered walls and it would be better to find a solution that would include conventional circuit components.

The present invention meets the problem by an outlet box construction that permits the circuit component to be mounted deeper than usual in the outlet box, the greater depth of mounting being sufficient to bring the cover plate tight against the wall surface even when the wall is a thin panel and the ears of the outlet box are mounted on the outer surface of the wall. As will be explained, this object is accomplished by a rearrangement of the outlet box ears to avoid contact with the component ears so that the component ears may be set back into the planes of the outlet box ears.

In the preferred practice of the invention the desired end is accomplished by providing the outlet box with ears that are generally U-shaped to provide clear spaces for the component ears. The U-shaped configuration permits the outlet box ears to straddle the component ears with both sets of ears in common planes at the rim of the outlet box. The preferred practice of the invention is also characterized by the provision of recesses in the receptacle rim to seat the component ears, and thus permit the component to be positioned even deeper into the outlet box.

The features and advantages of the invention will be apparent from the following detailed description taken with the accompanying drawing.

In the drawing, which is to be regarded as merely illustrative:

Fig. 1 is a perspective view of a typical wall installation of a duplex plug receptacle incorporating an outlet box embodying the present invention;

Fig. 2 is a longitudinal section taken as indicated by the line 2—2 of Fig. 1;

Fig. 3 is a view taken along the line 3—3 of Fig. 2 showing the outlet box in front elevation;

Fig. 4 is a fragmentary section taken as indicated by the line 4—4 of Fig. 3;

Fig. 5 is an enlarged longitudinal fragmentary section similar to Fig. 2 showing how the cover plate is pulled into pressure contact with the wall surface;

Fig. 5a is a fragmentary sectional view similar to Fig. 5 showing how an outlet box of conventional construction causes the cover plate to be spaced outward from the wall surface; and Fig. 6 is a fragmentary end elevation of the outlet box showing how the rim of the outlet box is recessed to provide seats for the component ears.

For the purpose of disclosure the drawing shows how the selected embodiment of the outlet box, generally designated by numeral 10, may be employed to mount a duplex plug receptacle 11 in a relatively thin wall panel 12 of plywood or the like with a cover plate 13 completely concealing the outlet box. The outlet box 10 is mounted in a rectangular opening 14 in the wall panel 12 and for this purpose two ear means 15 are provided respectively at the opposite ends of the outlet box at the rim thereof. As best shown in Fig. 2 the two ear means 15 are positioned on the outer surface 20 of the wall panel 12 adjacent the wall opening 14. Each of the ear means 15 is provided with a spaced pair of apertures 21 to receive corresponding screws 22 for anchoring the ear means to the wall panel.

Each of the two ear means 15 at the opposite ends of the outlet box 10 is attached to the outlet box at the rim thereof at two points, the two points being spaced laterally from each other on opposite sides of the longitudinal center line 23 of the outlet box. Preferably, but not necessarily, each of the ear means 15 comprises a single plate that is of U-shaped configuration in plan, as best shown in Fig. 3. The important consideration is that the ear means 15 serve the purpose of the invention by providing clear spaces on the opposite ends of the outlet box 10 at the rim thereof of sufficient dimension to receive the component ears 24, the component ears being, in this instance, the two ears of the duplex plug receptacle 11. Each of these ears 24 has the usual screw hole 25.

It is apparent that the provision of these clear spaces at the two ends of the outlet box in the region of the center line 23 permits the component ears 24 to be attached directly to the rim of the outlet box without interference by the two ear means 15. It is this provision for permitting the component ears 24 to pass into or through the planes of the ear means 15 of the outlet box 10 that solves the problem of installing the cover plate 13 in intimate contact with the wall surface 20. Such provision permits the component, in this instance the duplex plug receptacle 11, to be positioned deeper into the outlet box 10 than would otherwise be possible and since the cover plate 13 is carried by the component or duplex plug receptacle 11 the deeper positioning of the component brings the cover plate into snug abutment against the wall surface 20.

The two ear means 15 may be mounted on the outlet box 10 in any suitable manner. In the present embodiment of the invention the outlet box 10 is made of molded plastic material and each of the ear means 15 includes a pair of pins 26 of broken surface configuration imbedded in the material of the outlet box, as indicated in Fig. 4.

Each of the two end walls 28 of the outlet box 10 is increased in thickness near the rim as shown at 29 in Figs. 2 and 6 for the sake of the imbedded pins 26 and is further increased in thickness by the formation of an external rib 30 in the region of the center line 23 as shown in Figs. 4 and 6. Preferably the rectangular opening 14 in the wall panel 12 is of a longitudinal dimension to receive the thickened end portions 29 of the outlet box and the wall panel is further cut away at the opposite edges of the rectangular opening to provide clearance for the end ribs 30 of the box.

The purpose of the end ribs 30 is to make the outlet box long enough to make possible the provision of threaded bores 31 in each end of the box at the same spacing as the screw holes 25 in the component ears 24. Such spacing permits the component 11 to be attached directly to the outlet box 10 by suitable screws 32 threaded into the bores 31 through the screw holes 25 in the component ears 24, as shown in Figs. 2 and 5.

In some instances the ears 24 of the component or receptacle that is installed in the outlet box 10 are of appreciable greater thickness than the two ear means 15 at the opposite ends of the outlet box. In this regard, a further feature of the invention is the concept that suitable recesses may be provided in the rim of the outlet box at opposite ends thereof as indicated at 33 in Fig. 6. In this instance the recesses conform to the U-shaped configuration of the two ear means 15 thus being of sufficient area to seal the two component ears 24. The provision of such recesses 33 permits the component or receptacle 11 to be positioned deeper than usual in the outlet box 10 to make sure that the cover plate 13 will be drawn into close contact with the outer surface 20 of the wall panel 12.

The duplex plug receptacle 11, which constitutes the component that is mounted in the outlet box 10 in this example of the invention, is provided with a single central threaded hole 34 for attachment of the cover plate 13 thereto. The cover plate 13 is formed with the usual two windows 35 for access to the duplex plug receptacle 11 and is formed with a central countersunk bore 36 (Fig. 2), between the two windows to receive the single screw 40 by means of which the cover plate is attached to the duplex receptacle.

Fig. 5a indicates how a duplex plug receptacle, or other component having the usual component ears 24, is mounted on an outlet box. The outlet box 10a of Fig. 5a has the usual conventional ear means 41 which extend into the same region of the component ears 24 so that the component ears 24 must overlap the ear means 41 of the outlet box. The ear means 41 of the conventional outlet box 10a has a tapped bore 42 to receive the screw 32 for attachment of the corresponding component ear 24 thereto. It is this overlapping of each component ear 24 and the corresponding ear 41 of the outlet box that causes the cover plate 13 to be spaced outward from the wall surface 20 as shown in Fig. 5a.

In contrast to Fig. 5a, Fig. 5 shows how the positioning of the two component ears 24 in the same planes as the two ear means 15 of the outlet box 10 positions the duplex plug receptacle 11 deep enough into the outlet box to bring the cover plate 13 into abutment with the external surface 20 of the wall panel 12.

As those skilled in the art will appreciate, my description in specific detail of a selected embodiment of the invention will suggest changes and modifications thereof within the spirit and scope of the appended claims.

Having described my invention, I claim:

1. An elongated outlet box for mounting in an opening in a relatively thin wall panel to hold a circuit component that has relatively narrow apertured ears at its opposite ends for attachment by screws to the two ends of the outlet box and is adapted to carry a cover plate to conceal the outlet box, said outlet box comprising the combination of: a molded one-piece box-like body of plastic material having relatively thin bottom walls, relatively thin side walls and being relatively thin at the lower portions of its end walls, the upper portions of its two end walls being thickened to provide end rims wider than the side rims of the body to support said narrow ears of a circuit component, said end rims being recessed to provide planar seats offset inwardly from the plane of the side wall rims of the body and parallel to said plane to seat said narrow ears, said thickened end wall portions having central enlargements further increasing the width of said planar seats, said central enlargements on the two ends of the body having threaded bores for engagement by said attachment screws to hold said narrow ears against said planar seats; flat metal ear means at each end of said body parallel with said plane and extending longitudinally outward from the end rims of the body, said ear means being bonded directly to the rim material of the box and being apertured for attachment to the face of said panel adjacent said opening, said two ear means being U-shaped in plan and straddling the corresponding planar seats to provide clearance for said narrow ears; and anchoring means united with said two ear means respectively and embedded in said thickened end wall portions respectively of said body to hold said ear means rigid relative to the body.

2. An elongated outlet box for mounting in an opening in a relatively thin wall panel to hold a circuit component that has relatively narrow apertured ears at its opposite ends for attachment by screws to the two ends of the outlet box and is adapted to carry a cover plate to conceal the outlet box, said outlet box comprising the combination of: a molded one-piece box-like body of plastic material having relatively thin bottom walls, relatively thin side walls and thickened end walls to provide end rims wider than the side rims of the body to support said narrow ears of a circuit component, said end rims being recessed to provide planar seats offset inwardly from the plane of the side wall rims of the body and parallel to said plane to seat said narrow ears, said thickened end walls having threaded bores for engagement by said attachment screws to hold said narrow ears against said planar seats; flat metal ear means at each end of said body parallel with said plane and extending longitudinally outward from the end rims of the body, said ear means being bonded directly to the rim material of the box and being apertured for attachment to the face of said panel adjacent said opening, said two ear means being U-shaped in plan and straddling the corresponding planar seats to provide clearance for said narrow ears; and anchoring means united with said two ear means respectively and embedded in said thickened end walls respectively.

References Cited in the file of this patent

UNITED STATES PATENTS

| | | |
|---|---|---|
| 965,275 | Birtwhistle | July 26, 1910 |
| 1,026,164 | Hoffmann | May 14, 1912 |
| 1,481,117 | Ball | Jan. 15, 1924 |
| 2,374,622 | Rugg | Apr. 24, 1945 |